United States Patent
Shen

(10) Patent No.: US 10,225,176 B2
(45) Date of Patent: Mar. 5, 2019

(54) METHOD, APPARATUS AND NON-TRANSITORY COMPUTER-READABLE MEDIUM FOR DELIVERING PACKETS

(71) Applicant: INDUSTRIAL TECHNOLOGY RESEARCH INSTITUTE, Hsinchu (TW)

(72) Inventor: Shan-Hsiang Shen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 55 days.

(21) Appl. No.: 15/385,305

(22) Filed: Dec. 20, 2016

(65) Prior Publication Data
US 2018/0159761 A1 Jun. 7, 2018

(30) Foreign Application Priority Data
Dec. 1, 2016 (TW) .............................. 105139702 A

(51) Int. Cl.
*H04L 12/727* (2013.01)
*H04L 12/24* (2006.01)
(Continued)

(52) U.S. Cl.
CPC .......... *H04L 45/121* (2013.01); *H04L 41/083* (2013.01); *H04L 47/20* (2013.01); *H04L 47/24* (2013.01)

(58) Field of Classification Search
CPC ..... H04L 47/2416; H04L 45/50; H04L 45/54; H04L 12/56; H04L 12/24; H04L 45/121; H04L 47/24; H04L 47/20; H04L 41/083
See application file for complete search history.

(56) References Cited

U.S. PATENT DOCUMENTS

| | | | | |
|---|---|---|---|---|
| 7,881,291 B2* | 2/2011 | Grah | ................... | H04L 47/2416 370/389 |
| 8,478,707 B1* | 7/2013 | Ong | ....................... | H04L 45/54 706/47 |

(Continued)

FOREIGN PATENT DOCUMENTS

| | | |
|---|---|---|
| TW | 104202183 A | 12/2014 |
| TW | 201526578 A | 7/2015 |

(Continued)

OTHER PUBLICATIONS

Katta et al., "Cacheflow: Dependency-Aware Rule-Caching for Software-Defined Networks," Proceedings of the Symposium on SDN Research, Mar. 14, 2016, pp. 1-13.

(Continued)

*Primary Examiner* — Hanh N Nguyen
(74) *Attorney, Agent, or Firm* — Birch, Stewart, Kolasch & Birch, LLP

(57) ABSTRACT

A packet delivering method for a packet delivering apparatus includes: recording respective priorities of multiple packet delivering rules, which includes multiple first packet delivering rules and multiple second packet delivering rules respectively stored in a software layer and a main storage space of a hardware layer of the packet delivering apparatus; selecting a designated packet delivering rule from the first packet delivering rules; determining whether the main storage space is full; searching for at least one candidate delivering rule that meets a replacement condition from the second packet delivering rules according to the priorities of the designated data of the designated packet delivering rule and the second packet delivering rules when the main storage space is full; and replacing one of the at least one candidate packet delivering rule by the designated packet (Continued)

delivering rule when the at least one candidate packet delivering rule exists.

21 Claims, 5 Drawing Sheets

(51) Int. Cl.
*H04L 12/813* (2013.01)
*H04L 12/851* (2013.01)

(56) References Cited

U.S. PATENT DOCUMENTS

| | | | |
|---|---|---|---|
| 9,160,650 B2 | 10/2015 | Zhang et al. | |
| 2007/0171911 A1* | 7/2007 | Ku | H04L 45/00 370/392 |
| 2013/0170495 A1 | 7/2013 | Suzuki et al. | |
| 2014/0146674 A1 | 5/2014 | Wang et al. | |
| 2015/0124815 A1 | 5/2015 | Beliveau et al. | |
| 2015/0131667 A1 | 5/2015 | Ko et al. | |
| 2015/0195183 A1 | 7/2015 | Park et al. | |
| 2016/0072696 A1 | 3/2016 | He et al. | |
| 2016/0072717 A1 | 3/2016 | Ansari et al. | |
| 2016/0254997 A1 | 9/2016 | Kurudi Matada et al. | |

FOREIGN PATENT DOCUMENTS

| | | |
|---|---|---|
| TW | 104871501 A | 8/2015 |
| TW | 105763437 A | 7/2016 |

OTHER PUBLICATIONS

Kim et al., "An Efficient Flow Table Replacement Algorithm for SDNs with Heterogeneous Switches," 7th International Conference on Information Technology and Electrical Engineering (ICITEE); Chiang Mai, Thailand, 2015, pp. 300-303.

Lazaris et al., "Tango: Simplifying SDN Control with Automatic Switch Property Inference, Abstraction, and Optimization," Proceedings of the 10th ACM International on Conference on emerging Networking Experiments and Technologies, Dec. 2, 2014, 13 pages.

Lee et al., "An Efficient Flow Cache algorithm with Improved Fairness in Software-Defined Data Center Networks," IEEE 2nd International Conference on Cloud Networking (CloudNet): Full Paper, 2013, pp. 18-24.

Li et al., "FDRC: Flow-Driven Rule Caching Optimization in Software Defined Networking," IEEE ICC 2015—Next Generation Networking Symposium, 2015, pp. 5777-5782.

Sheu et al., "Wildcard Rules Caching and Cache Replacement Algorithms in Software-Defined Networking," IEEE Transactions on Network and Service Management, vol. 13, No. 1, Mar. 2016, pp. 19-29.

Yu et al., "Scalable Flow-Based Networking with DIFANE," Computer Communication Review, Oct. 2010, 12 pages.

\* cited by examiner

METHOD, APPARATUS AND NON-TRANSITORY COMPUTER-READABLE MEDIUM FOR DELIVERING PACKETS

This application claims the benefit of Taiwan application Serial No. 105139702, filed Dec. 1, 2016, the disclosure of which is incorporated by reference herein in its entirety.

TECHNICAL FIELD

The disclosure relates to a method, apparatus and non-transitory computer-readable medium for delivering packets.

BACKGROUND

Along with the development of communication technologies, how to shorten the delay in delivering packets to satisfy network transmission requirements is an essential task. Taking 5G mobile communication networks for example, the delay from a node to a node in the network needs to be smaller than 5 ms to 30 ms.

A node in the network is, for example, a network switch, which delivers a packet to a next node according to a message of a received packet and a packet delivering rule stored in a ternary content-addressable memory (TCAM). However, if the TCAM does not contain a packet delivering rule applicable to the received packet, the received packet is sent to a software layer of the network switch for further processing. This increases the network delay, and is also unfavorable for certain applications, e.g., 5G mobile communication networks, which demand special requirements on network delay.

Therefore, there is a need for a packet delivering technology that effectively reduces network delay.

SUMMARY

The disclosure is directed to a method, apparatus and non-transitory computer-readable medium for delivering packets. By designating a priority to each packet delivering rule, the sequences of loading the packet delivering rules from a software layer of the packet delivering apparatus to a hardware layer may be planned, such that the packet delivering rules may be stored in the hardware layer of the packet delivering apparatus according to the planning of a controller (e.g., a network manager). Because the delay resulted from transmitting packets directly through a hardware layer is shorter, the packet delivering technology of the disclosure is capable of adaptively improving the delay in packet delivery of specific network applications.

According to one embodiment, a packet delivering method is provided. The packet delivering method, adapted for a packet delivering apparatus, includes: recording respective priorities for a plurality of packet delivering rules loaded into the packet delivering apparatus, the plurality of packet delivering rules including a plurality of first packet delivering rules stored in a software layer of the packet delivering apparatus and a plurality of second packet delivering rules stored in a main storage space in a hardware layer of the packet delivering apparatus; selecting a designed packet delivering rule to be loaded to the hardware layer from the first packet delivering rules; determining whether the main storage space is full; when the main storage is full, searching for at least one candidate packet delivering rule that meets a replacement condition from the second packet delivering rules according to the designated packet delivering rule and the priorities of the second packet delivering rules; and, when one or multiple candidate packet delivering rules exist, replacing one of the at least one candidate packet delivering rule by the designated packet delivering rule.

According to another embodiment, a non-transitory computer-readable medium including an instruction sequence is provided. When executed by a processor, the instruction sequence causes a computer system to perform steps of: recording respective priorities for a plurality of packet delivering rules loaded into the packet delivering apparatus, the plurality of packet delivering rules including a plurality of first packet delivering rules stored in a software layer of the packet delivering apparatus and a plurality of second packet delivering rules stored in a main storage space in a hardware layer of the packet delivering apparatus; selecting a designed packet delivering rule to be loaded to the hardware layer from the first packet delivering rules; determining whether the main storage space is full; when the main storage is full, searching for at least one candidate packet delivering rule that meets a replacement condition from the second packet delivering rules according to the designated packet delivering rule and the priorities of the second packet delivering rules; and when one or multiple candidate packet delivering rules exist, replacing one of the at least one candidate packet delivering rule by the designated packet delivering rule.

According to an alternative embodiment, a packet delivering apparatus is provided. The packet delivering apparatus includes an interface circuit, a hardware layer and a software layer. The interface circuit receives a plurality of packet delivering rules, which are designated with respective priorities. The hardware layer includes a main storage space. The software layer, coupled between the interface circuit and the software layer, stores a plurality of first packet delivering rules of the packet delivering rules, and loads a plurality of second packet delivering rules of the packet delivering rules to the main storage space of the hardware layer. The software layer further selects a designated packet delivering rule to be loaded to the hardware layer from the first packet delivering rules, determines whether the main storage space is full, searches for at least one candidate packet delivering rule that meets a replacement condition from the second packet delivering rules according to the designated packet delivering rule and the priorities of the second packet delivering rules when the main storage is full, and replaces one of the at least one candidate packet delivering rule by the designated packet delivering rule when one or multiple candidate packet delivering rules exist.

Figure 1:
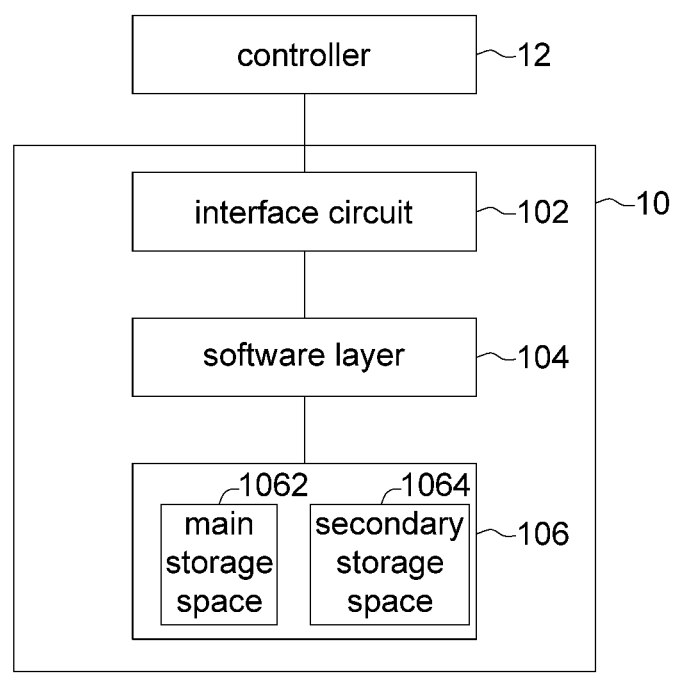
FIG. 1 is a block diagram of a packet delivering apparatus according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the application, embodiments of the disclosure are described in detail with reference to the accompanying drawings. However, not all embodiments are depicted in these drawings. The disclosure may be implemented in different variations and is not limited to the disclosed embodiments. Further, the embodiments provided in the disclosure fully meet legal application requirements. The same reference denotations in the drawings represent identical or similar elements.

FIG. 1 shows a block diagram of a packet delivering apparatus 10 according to an embodiment. For example, the packet delivering apparatus 10 is a network switch, or a network node adapted to receive a packet and transmit the packet according to a predetermined rule.

The packet delivering apparatus 10 includes an interface circuit 102, a software layer 104 and a hardware layer 106. The interface circuit 102 is adapted to receive multiple packet delivering rules, which are designated with the respective priorities. The packet delivering rules and the priorities respectively corresponding to these packet delivering rules may be sent from, for example, a controller 12 that serves as an upper-layer network manager. The interface circuit 102 may be implemented by a hardware circuit to serve as a port of the packet delivering apparatus 10 to transceive external signals.

The software layer 104 is coupled between the interface circuit 102 and the hardware layer 106. The software layer 104 stores the packet delivering rules from the interface circuit 102, and is also capable of loading the packet delivering rules to the hardware layer 106. For example, the software layer 104 may be implemented by at least one of software (e.g., a processor-executable program code) and hardware (e.g., an operation logic circuit).

The hardware layer 106 includes a main storage space 1062. The hardware layer 106 may be implemented by a ternary content-addressable memory (TCAM) to store the packet delivering rules loaded from the software layer 104. In general, the hardware layer 106 features a high speed but also a high cost, and so the software layer 104 is usually designed to store a larger number of the packet delivering rules based on cost considerations and required packet delivering rules are then loaded to the hardware layer 106 based on requirements.

In one embodiment, the hardware layer 106 further includes a secondary storage space 1064, into which the software layer 104 loads a packet delivering rule that meets a predetermined condition. Details associated with the secondary storage space 1064 are to be described shortly.

When the packet delivering apparatus 10 receives an external packet, the packet delivering apparatus 10 first retrieves information from the packet (e.g., header information) to compare whether the hardware layer 106 contains a packet delivering rule suitable for delivering the packet. If so, the packet delivering apparatus 10 directly delivers the packet through the hardware layer 106. If not, the packet delivering apparatus 10 further determines whether the packet delivering rule suitable for delivering the packet exists in the software layer 104, which however usually causes a longer network delay. Thus, how to plan the packet delivering rules stored in the hardware layer 106 to allow the packet to match the corresponding packet delivering rule in the hardware layer 106 is one optimization target for reducing the network delay.

According to an embodiment, each packet delivering rule is designed with a predetermined priority to determine the priorities of loading the packet delivering rules from the software layer 104 to the hardware layer 106 of the packet delivering apparatus 10. Thus, the packet delivering rules may be stored in the hardware layer 106 of the packet delivering apparatus 10 according to the network plan, so as to adaptively improve the packet delivery delay for certain network applications.

Figure 2:
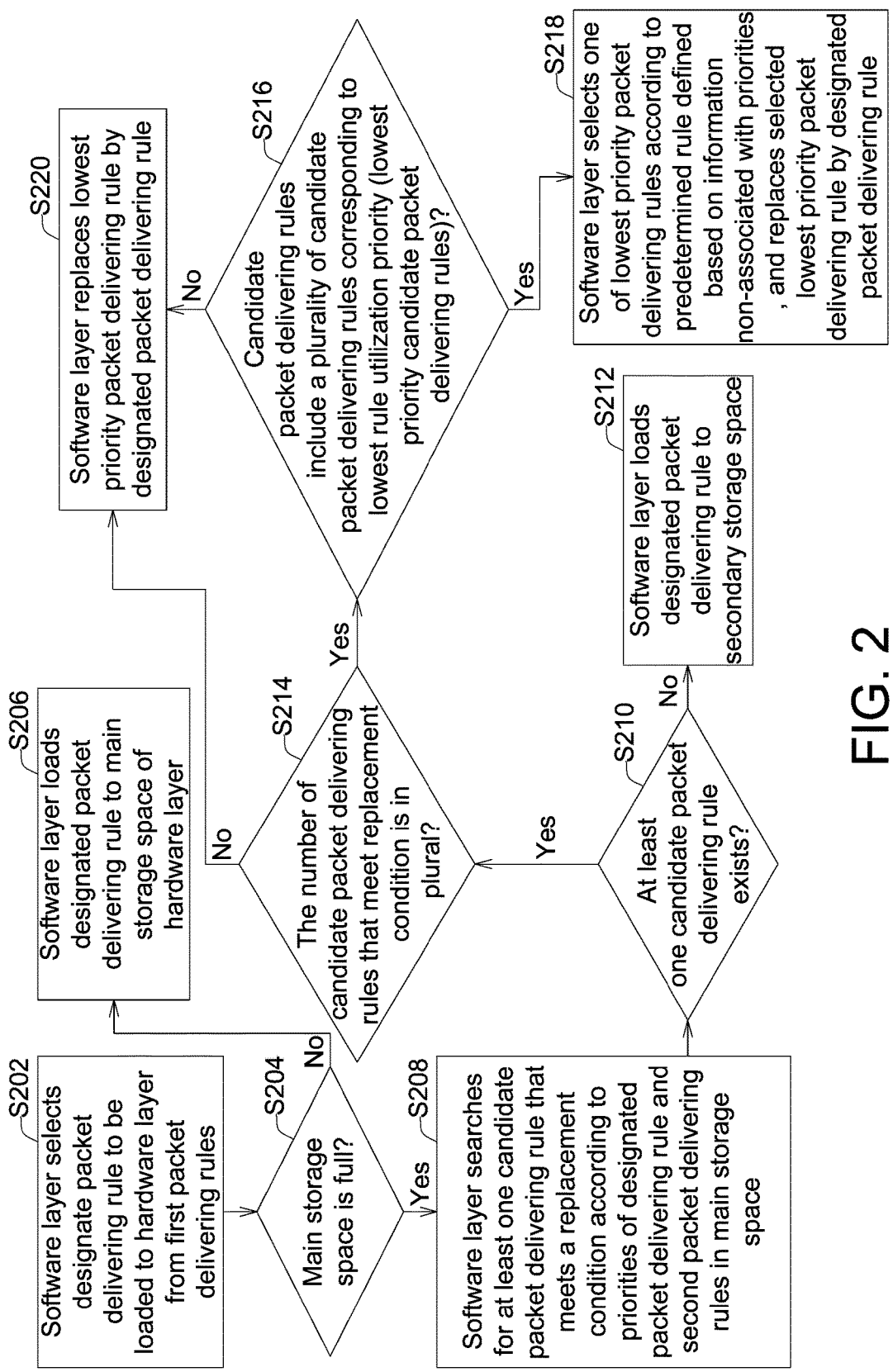
FIG. 2 is a flowchart of a method for delivering packets according to an embodiment.

FIG. 2 shows a flowchart of a packet delivering method according to an embodiment. The packet delivering method is adapted for the packet delivering apparatus 10 shown in FIG. 1, for example. In the description below, first packet delivering rules represent packet delivering rules stored in the software layer 104, second packet delivering rules represent packet delivering rules stored in a main storage space 1062 of the hardware layer 106, and the third packet delivering rules represent packet delivering rules stored in the secondary storage space 1064 of the hardware layer 106.

In step S202, the software layer 104 selects designated packet delivering rule(s) to be loaded to the hardware layer 106 from the first packet delivering rules. For example, the software layer 104 may select an appropriate first packet delivering rule (the designated packet delivering rule), to be loaded to the hardware layer 106, according to the information of a received packet.

In step S204, the software layer 104 determines whether the main storage space 1062 of the hardware layer 106 is full. When the main storage space 1062 is full, it means that there is not enough room for loading an entry corresponding to the designated packet delivering rules. Conversely, when the main storage space 1062 is not full, it means that the main storage space 1062 has available room for loading the new packet delivering rules. At this point, the software layer 104 directly loads the designated packet delivering rules to the main storage space 1062 of the hardware layer 106, as shown in step S206.

In step S208, when the main storage space 1062 is full, according to the priorities of the designated packet delivering rules and the priorities of multiple second packet delivering rules in the main storage space 1062, the software layer 104 searches for at least one candidate packet delivering rule that meets a replacement condition from the second packet delivering rules.

Each of the priorities corresponding to the packet delivering rules indicates, for example, a rule utilization priority. The rule utilization priority of a packet delivering rule defines the replaceability of the packet delivering rule in the main storage space 1062. In principle, a packet delivering rule having a lower rule utilization priority may be replaced by a packet delivering rule having a higher rule utilization priority, but a packet delivering rule having a higher rule utilization priority cannot be replaced by a packet delivering rule having a lower rule utilization priority. In other words, a packet delivering rule having a higher rule utilization priority means that this packet delivering rule has a greater chance of being stored in the main storage space 1062 of the hardware layer 106.

For example, if the rule utilization priority of a second packet delivering rule is "3" and a designated packet delivering rule that the software layer 104 wishes to load to the hardware layer 106 is "5", the software layer 104 regards the second packet delivering rule as a candidate packet delivering rule that may be replaced by the designated packet delivering rule. In other words, the rule utilization priority corresponding to the candidate packet delivering rule is lower than the rule utilization priority corresponding to the designated packet delivering rules.

It should be noted that, the disclosure is not limited to the above example. Any approach that defines the replaceability of a packet delivering rule in the main storage space 1062 according to a value of the priority (referred to as a priority value in short) is encompassed within the scope of the disclosure. For example, the higher the priority value defined is, the higher the replaceability of a corresponding packet delivering rule is. At this point, the so-called candidate packet delivering rule refers to the second packet delivering rule having a priority value higher than the priority value of the designated packet delivering rule.

In step S210, the software layer 104 determines whether at least one candidate packet delivering rule exists in the main storage space 1062, i.e., determining whether the second packet delivering rule that meets the replacement condition exists.

In step S212, when the candidate packet delivering rule does not exist in the main storage space 1062, for example, when the rule utilization priority of the designated packet delivering rule is lower than the rule utilization priority of the second packet delivering rule, the software layer 104 loads the designate packet delivering rule into the secondary storage space 1064, so as to prevent certain designate packet delivering rules having lower rule utilization priorities from not ever being able to be loaded to the hardware layer 106.

When the secondary storage space 1064 is full, according to a predetermined rule defined based on information non-associated with the priorities, the software layer 104 selects one of the third packet delivering rules, which is to be replaced by the designate packet delivering rules, from the secondary storage space 1064. The predetermined rule may be a least recently used (LRU) algorithm, a least frequently used (LFU) algorithm or other data replacement algorithm defined based on information non-associated with the priorities. In other words, the rule replacement mechanism in the secondary storage space 1064 is not determined according to the priorities; that is, even when the rule utilization priority of the designated packet delivering rule is low, the software layer 104 may still load the designated packet delivering rule to the hardware layer 106 for further use.

When the candidate packet delivering rule exists, the software layer 104 replaces one of the at least one candidate packet delivering rule by the designated packet delivering rules. As shown in step S214, the software layer 104 first determines whether there are a plurality of candidate packet delivering rules that meet the replacement condition.

In step S216, when the number of candidate packet delivering rules is in plural, the software layer 104 further determines whether these candidate packet delivering rules include a plurality of candidate packet delivering rules corresponding to a lowest rule utilization priority (to be referred to as lowest priority candidate packet delivering rules in short). The so-called lowest priority candidate packet delivering rules refer to existing second packet delivering rules that have a lowest rule utilization priority relative to the other second packet delivering rules stored in the main storage space 1062.

In step S218, when the candidate packet delivering rules include a plurality of lowest priority candidate packet delivering rules, according to a predetermined rule defined based on information non-associated with the priorities, the software layer 104 selects one from the lowest priority candidate packet delivering rules that is to be replaced by the designated packet delivering rules. For example, the predetermined rule is an LRU or LFU data replacement rule or other data replacement rule non-associated with the priorities.

In step S220, when there is only one lowest priority candidate packet delivering rule in the candidate packet delivering rules, or there is only one candidate packet delivering rule (which is naturally a lowest priority candidate packet delivering rule), the software layer 104 selects the lowest priority candidate packet delivering rule that is then replaced by the designated packet delivering rules.

To better understand the disclosure, the packet delivering rule replacement mechanism according to embodiments of the disclosure are described in detail with reference to FIG. 3 to FIG. 5.

Figure 3:
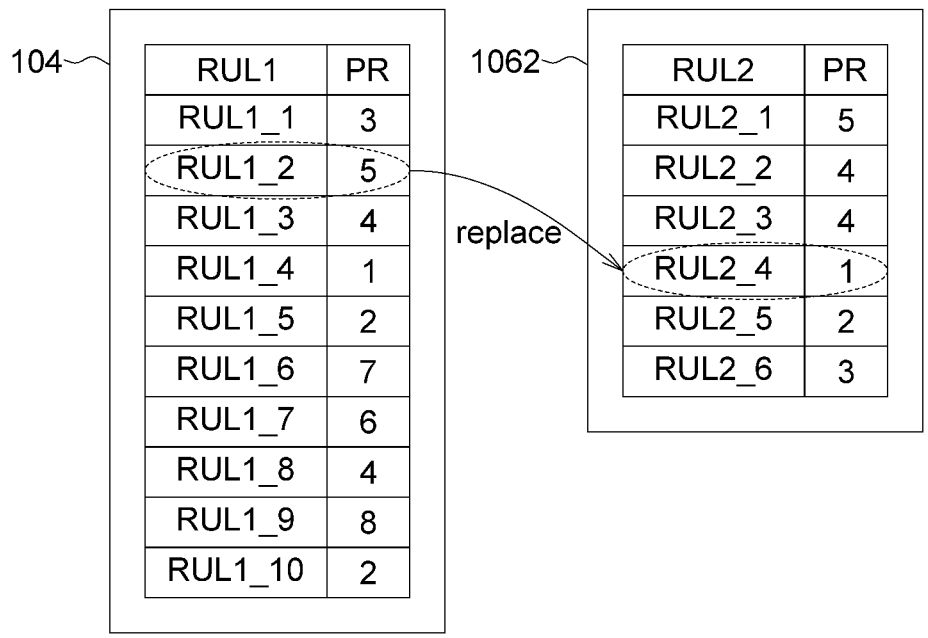
FIG. 3 is a schematic diagram of a packet delivering rule replacement mechanism according to an embodiment.

FIG. 3 shows a schematic diagram of a packet delivering rule replacement mechanism according to an embodiment. In the embodiment in FIG. 3, the software layer 104 stores first packet delivering rules RUL1 (RUL1_1 to RUL1_10) and the rule utilization priorities PR indicated by the corresponding priority respectively. The main storage space 1062 of the hardware layer 106 stores second packet delivering rules RUL2 (RUL2_1 to RUL2_6) and the rule utilization priorities PR indicated by the corresponding priority respectively. As shown in FIG. 3, the rule utilization priorities PR of the first packet delivering rules RUL1_1 to RUL1_10 are respectively 3, 5, 4, 1, 2, 7, 6, 4, 8 and 2; the rule utilization priorities PR of the second packet delivering rules RUL2_1 to RUL2_6 are respectively 5, 4, 4, 1, 2 and 3.

If the software layer 104 wishes to load the first packet delivering rule RUL1_2 (the designated packet delivering rule) to the main storage space 1062 of the hardware layer 106 but the main storage space 1062 is already full, the software layer 104 sequentially compares values of the rule utilization priority PR (=5) of the designated packet delivering rule RUL1_2 with the rule utilization priorities PR of the second packet delivering rules RUL2_1 to RUL2_6, to further determine the second packet delivering rules RUL2_2 to RUL2_6 having relatively lower utilization priorities PR (<5) as candidate packet delivering rules.

Because the candidate packet delivering rule RUL2_4, among all of the candidate packet delivering rules RUL2_2 to RUL2_6, corresponds to the lowest rule utilization priority PR (=1), the software layer 104 selects the candidate packet delivering rule RUL2_4 that is then to be replaced by the designated packet delivering rule RUL1_2.

Figure 4:
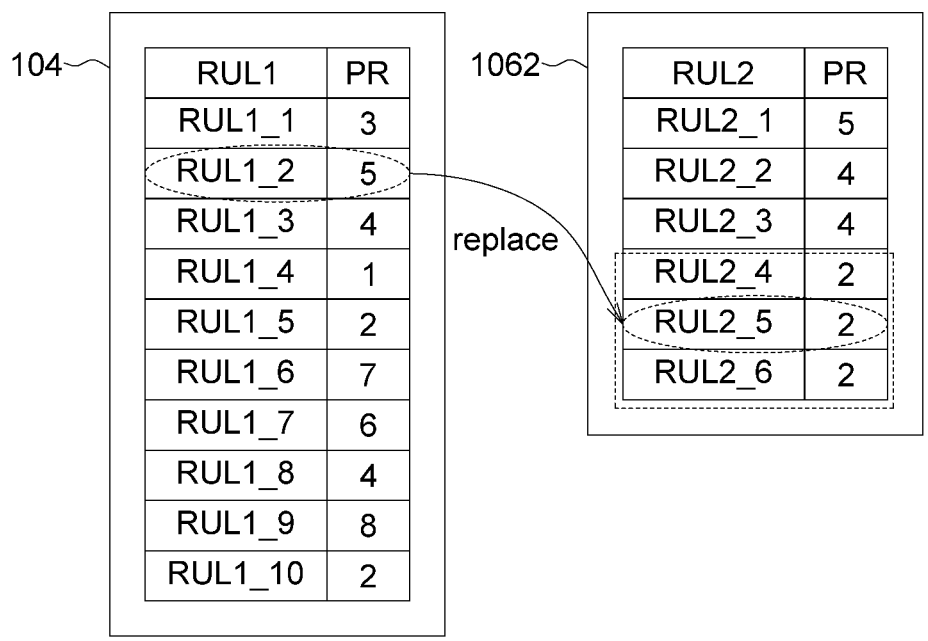
FIG. 4 is a schematic diagram of a packet delivering rule replacement mechanism according to another embodiment.

FIG. 4 shows a schematic diagram of a packet delivering rule replacement mechanism according to another embodiment. A difference of the embodiment in FIG. 4 from that in FIG. 3 is that, the rule utilization priorities PR of the second packet delivering rules RUL2_1 to RUL2_6 are respectively 5, 4, 4, 2, 2 and 2.

When the software layer 104 wishes to load the first packet delivering rule RUL1_2 (the designated packet delivering rule) to the main storage space 1062 of the hardware layer 106, as the main storage space 1062 is already full, the software layer 104 sequentially compares the values of the rule utilization priority PR (=5) of the designated packet delivering rule RUL1_2 with the rule utilization priorities PR of all of the second packet delivering rules RUL2_1 to RUL2_6, and determines the second packet delivering rules RUL2_2 to RUL2_6 having relatively lower rule utilization priorities PR as candidate packet delivering rules.

The candidate packet delivering rules RUL2_2 to RUL2_6 include multiple lowest priority candidate packet delivering rules RUL2_4 to RUL2_6 corresponding to the lowest rule utilization priorities PR (=2). Thus, at this point, the software layer 104 selects one (RUL2_5) of these lowest priority candidate packet delivering rules RUL2_4 to RUL2_6 that is to be replaced by the designated packet delivering rule RUL1_2 according to a predetermined rule (e.g., LRU or LFU).

Figure 5:
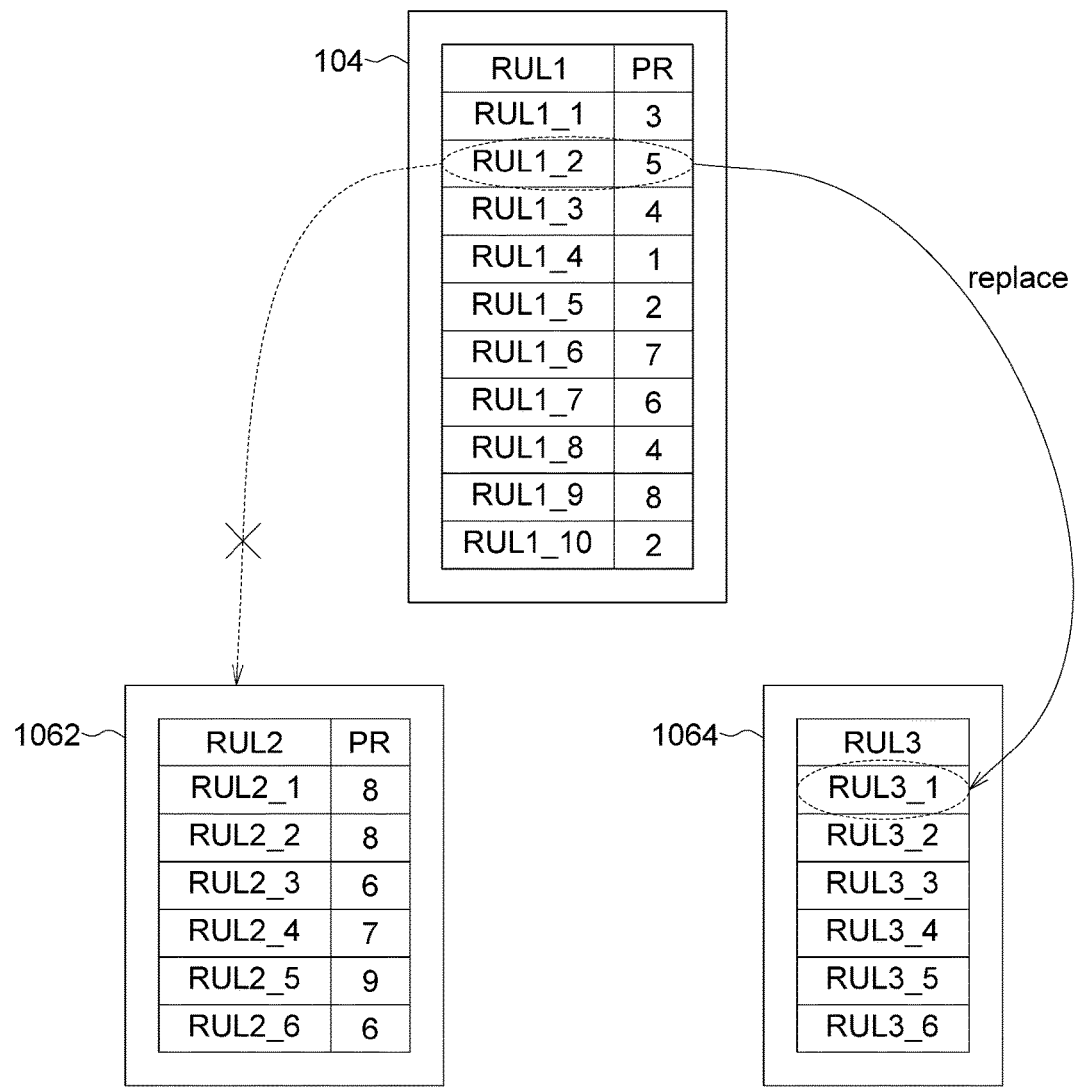
FIG. 5 is a schematic diagram of a packet delivering rule replacement mechanism according to yet another embodiment.

FIG. 5 shows a schematic diagram of a packet delivering rule replacement mechanism according to yet another embodiment. In this embodiment, both of the main storage space 1062 and the secondary storage space 1064 of the hardware 106 are full. The main storage space 1062 includes the second packet delivering rules RUL2_1 to RUL2_6; the secondary storage space 1064 includes third packet delivering rules RUL3_1 to RUL3_6.

When the software layer 104 wishes to load the first packet delivering rule RUL1_2 (the designated packet delivering rule) to the main storage space 1062 of the hardware layer 106, because the rule utilization priority PR (=5) of the designated packet delivering rule RUL1_2 is lower than the rule utilization priorities PR of all of the second packet delivering rules RUL2_1 to RUL2_6, the designated packet delivering rule RUL1_2 cannot replace any of the second packet delivering rules RUL2_1 to RUL2_6.

At this point, the software layer 104 chooses to load the designated packet delivering rule RUL1_2 to the secondary storage space 1064. Because the secondary storage space 1064 is full, the software layer 104 selects one of the third packet delivering rules RUL3_1 to RUL3_6 (e.g., RUL3_1) that is to be replaced by the designated packet delivering rule RUL1_2 according to a predetermined rule (e.g., LRU or LFU).

Figure 6:
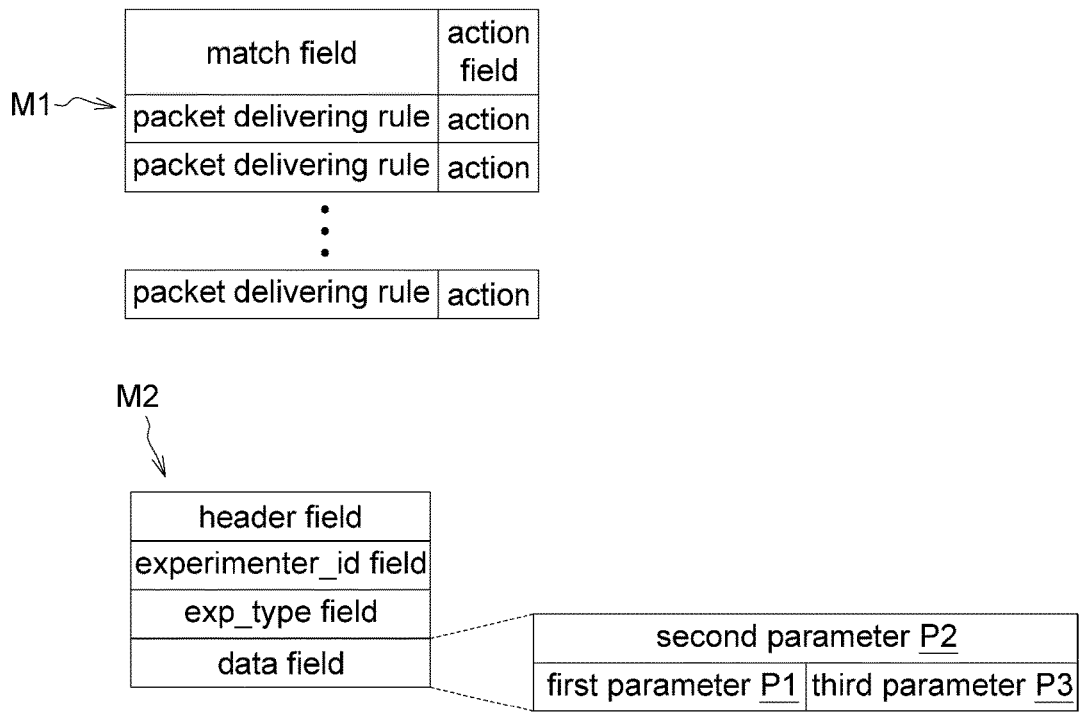
FIG. 6 is a schematic diagram of a packet delivering rule and a data format of the priority according to an embodiment.

FIG. 6 shows a schematic diagram of a packet delivering rule and a data format of the priority according to an embodiment. In this embodiment, the interface circuit 102 of the packet delivering apparatus 10 may receive a packet delivering rule from a first message M1 sent from the controller 12, and receive the priority of the packet delivering rule from a second message M2 sent from the controller 12.

For example, the first message M1 is a flow modify (Flowmod) message in the OpenFlow protocol, and includes a match field for describing a packet delivering rule and an action field for describing the processed action of the packet.

For example, the second message M2 is a Vendor-Experimenter message in the OpenFlow protocol, and includes a Header field, an experimenter identity (Experimenter_id) field, an experimenter type (Exp_type) field and a Data field. The priority is defined in the data field.

As shown in FIG. 6, the data field includes three parameters P1, P2 and P3. The first parameter P1 indicates a rule utilization priority PR, the second parameter P2 indicates a packet delivering rule corresponding to the rule utilization priority PR, and the third parameter P3 enables an immediate writing operation. When the immediate writing operation is enabled, the packet delivering rule indicated by the second parameter P2 is directly loaded to the hardware layer 106, regardless of whether the packet associated with the packet delivering rule has entered the packet delivering apparatus 10.

For example, the controller 12 may send the first message M1 to the packet delivering apparatus 10 to load a packet delivering rule, and send the corresponding second message M2 that carries the priority of the packet delivering rule. Assuming that the second message M2 is realized by a Vendor-Experimenter message, the second message M2 shall include the first parameter P1 to describe a rule utilization priority PR, the second parameter P2 to describe that the rule utilization priority PR corresponds to the packet delivering rule, and the third parameter P3 to indicate whether to enable an immediate writing operation.

When the immediate writing operation is enabled, the packet delivering rule described in the second parameter P2 is directly loaded to the hardware layer 106 according to the method in FIG. 2. Conversely, when the immediate writing operation is disabled, the packet delivering rule described in the second parameter P2 is loaded to the hardware layer 106 according to the method in FIG. 2 only after an associated packet enters the packet delivering apparatus 10.

Figure 7:
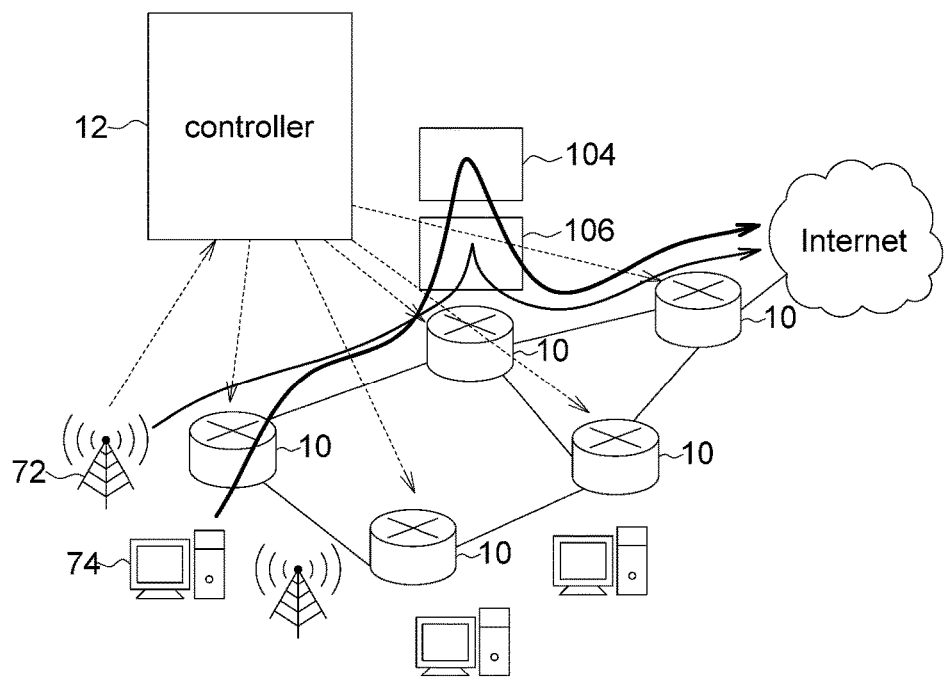
FIG. 7 is a schematic diagram of a network.

FIG. 7 shows a schematic diagram of a network 700. For example, the network 700 is a small-cell network applied in an Enterprise environment, and includes small-cell base stations suitable for 5G mobile communications (referred to as a 5G small-cell base station for short) 72, multiple Enterprise client devices 74, and multiple packet delivering apparatuses 10 controlled by the controller 12.

Two types of packets may coexist in the network 700—packets of 5G mobile communication networks (referred to as 5G network packets for short), and packets in an Enterprise network 700 (referred to as Enterprise network packets). The 5G small-cell base station 72 may request the controller 12 through a northbound application program interface (API) to designate higher rule utilization priorities PR for packets associated with the 5G communication network to satisfy requirements of 5G mobile communications regarding network delay. In response to the request of the 5G small-cell base station, the controller 12 may load the priorities of packet delivering rules to the packet delivering apparatus 10 through the OpenFlow protocol. According to the rule utilization priorities PR designated by the priorities, the packet delivering apparatus 10 preserves the packet delivering rules associated with 5G mobile communications in the hardware layer 106 to reduce the transmission delay of 5G network packets.

On the other hand, the controller 12 designates lower rule utilization priorities PR to packets associated with the Enterprise network, and so these packet delivering rules have a greater chance of not being preserved in the hardware layer 106. Thus, the enterprise network packets have a greater probability of being sent to the software layer 104 and then have a larger network delay.

Through the above mechanism, a network is capable of adaptively optimizing network delay for certain network applications, e.g., 5G mobile communication networks, to satisfy associated transmission requirements.

A non-transitory computer-readable medium including an instruction sequence is further provided by the disclosure. When executed, the instruction sequence causes a computer system to perform the packet delivering method described in the foregoing embodiments. The non-transitory computer-readable medium is, for example, a recording medium such as a hard drive, a floppy disk, a CD-ROM or a semiconductor memory.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A packet delivering method, adapted for a packet delivering apparatus, comprising:

recording respective priorities for a plurality of packet delivering rules loaded into the packet delivering apparatus, the packet delivering rules comprising a plurality of first packet delivering rules stored in a software layer of the packet delivering apparatus, and a plurality of second packet delivering rules stored in a main storage space of a hardware layer of the packet delivering apparatus;

selecting a designated packet delivering rule to be loaded to the hardware layer from the first packet delivering rules;

determining whether the main storage space is full;

when the main storage space is full, searching for at least one candidate packet delivering rule from the second packet delivering rules according to the designated packet delivering rule and the priorities of the second packet delivering rules; and when one or a plurality of candidate packet delivering rules exist, replacing one of the at least one candidate packet delivering rule by the designated packet delivering rule.

2. The packet delivering method according to claim 1, wherein each of the priorities corresponding to the packet delivering rules indicates a rule utilization priority, and the rule utilization priority corresponding to the at least one candidate packet delivering rule is lower than the rule utilization priority corresponding to the designated packet delivering rule.

3. The packet delivering method according to claim 2, wherein the number of the at least one candidate packet delivering rule is plural, and the packet delivering method further comprises:

from the candidate packet delivering rules, selecting the candidate packet delivering rule corresponding to a lowest rule utilization priority and replacing a selected candidate packet delivering rule by the designated packet delivering rule.

4. The packet delivering method according to claim 2, wherein the number of the at least one packet delivering rule is plural, and the at least one candidate packet delivering rule comprises a plurality of candidate packet delivering rules corresponding to a lowest rule utilization priority, and the packet delivering method further comprises:

selecting one of the candidate packet delivering rules that corresponds to a lowest rule utilization priority according to a predetermined rule defined based on information non-associated with the priorities, and replacing the selected candidate packet delivering rule by the designated packet delivering rule.

5. The packet delivering method according to claim 1, further comprising:

when the main storage space is not full, directly loading the designated packet delivering rule to the main storage space of the hardware layer.

6. The packet delivering method according to claim 1, wherein the packet delivering rules further comprise a plurality of third packet delivering rules stored in a secondary storage space of the hardware layer, and the packet delivering method further comprises:

when the one or plurality of candidate packet delivering rules do not exist, selecting one of the third packet delivering rules according to a predetermined rule defined based on information non-associated with the priorities, and replacing the selected third packet delivering rule by the designated packet delivering rule.

7. The packet delivering method according to claim 1, further comprising:

obtaining the packet delivering rules from a first message; and obtaining the priorities of the packet delivering rules from a second message.

8. The packet delivering method according to claim 7, wherein the second message is a vendor-experimenter message in an OpenFlow protocol, and the priorities are defined in a data field of the vendor-experimenter message.

9. The packet delivering method according to claim 8, wherein the data field comprises:

a first parameter, indicating a rule utilization priority;

a second parameter, indicating the packet delivering rule corresponding to the rule utilization priority; and a third parameter, indicating an immediate writing operation is enabled or not;

wherein the immediate writing operation is enabled, the packet delivering rule indicated by the second parameter is directly loaded to the hardware layer.

10. The packet delivering method according to claim 1, wherein the hardware layer is implemented by a ternary content-addressable memory (TCAM).

11. A non-transitory computer-readable medium, comprising an instruction sequence, the instruction sequence causing a computer system to perform the packet delivering method of claim 1 when executed.

12. A packet delivering apparatus, comprising:

an interface circuit, receiving a plurality of packet delivering rules, the packet delivering rules designated with respective priorities;

a hardware layer, comprising a main storage space; and a software layer, coupled between the interface circuit and the hardware layer, storing a plurality of first packet delivering rule of the packet delivering rules, and loading a plurality of second packet delivering rules of the packet delivering rules to the main storage space of the hardware layer, the software layer further:

selects a designated packet delivering rule to be loaded to the hardware layer from the first packet delivering rules;

determines whether the main storage space is full;

when the main storage space is full, searches for at least one candidate packet delivering rule from the second packet delivering rules according to the designated packet delivering rule and the priorities of the second packet delivering rules; and when one or a plurality of candidate packet delivering rules exist, replaces one of the at least one candidate packet delivering rule by the designated packet delivering rule.

13. The packet delivering apparatus according to claim 12, wherein the respective priorities corresponding to the packet delivering rules indicates a rule utilization priority, and the rule utilization priority corresponding to the at least one candidate packet delivering rule is lower than the rule utilization priority corresponding to the designated packet delivering rule.

14. The packet delivering apparatus according to claim 13, wherein the number of the at least one candidate packet delivering rule is plural, the software layer further:

from the candidate packet delivering rules, selects a candidate packet delivering rule corresponding to a lowest rule utilization priority and replaces the selected candidate packet delivering rule by the designated packet delivering rule.

15. The packet delivering apparatus according to claim 13, wherein the number of the at least one packet delivering rule is plural, the at least one candidate packet delivering rule comprises a plurality of candidate packet delivering rules corresponding to a lowest rule utilization priority, and the software layer further:

selects one of the candidate packet delivering rules that corresponds to the lowest rule utilization priority according to a predetermined rule defined based information non-associated with the priorities, and replaces the selected candidate packet delivering rule by the designated packet delivering rule.

16. The packet delivering apparatus according to claim 12, wherein when the main storage space is not full, the software layer directly loads the designated packet delivering rule to the main storage space of the hardware layer.

17. The packet delivering apparatus according to claim 12, wherein the hardware layer further comprises a secondary storage space that stores a plurality of third packet delivering rules, and the software layer further:

when the one or plurality of candidate packet delivering rules do not exist, selects one of the third packet delivering rules according to a predetermined rule defined based on information non-associated with the priorities, and replaces the selected third packet delivering rule by the designated packet delivering rule.

18. The packet delivering apparatus according to claim 12, wherein the interface circuit further receives the packet delivering rules from a first message sent from a controller, and receives the priorities of the packet delivering rules from a second message sent from the controller.

19. The packet delivering apparatus according to claim 18, wherein the second message is a vendor-experimenter message in an OpenFlow protocol, and the priorities are defined in a data field of the vendor-experimenter message.

20. The packet delivering apparatus according to claim 19, wherein the data field comprises:

a first parameter, indicating a rule utilization priority;

a second parameter, indicating the packet delivering rule corresponding to the rule utilization priority; and a third parameter, enabling an immediate writing operation;

wherein the immediate writing operation is enabled, the packet delivering rule indicated by the second parameter is directly loaded to the hardware layer.

21. The packet delivering apparatus according to claim 12, wherein the hardware layer is implemented by a ternary content-addressable memory (TCAM).

\* \* \* \* \*